Nov. 14, 1967    J. J. ZIMMERMAN    3,352,276
PONTOON BOAT CYCLE DRIVE
Filed April 3, 1967    2 Sheets-Sheet 1
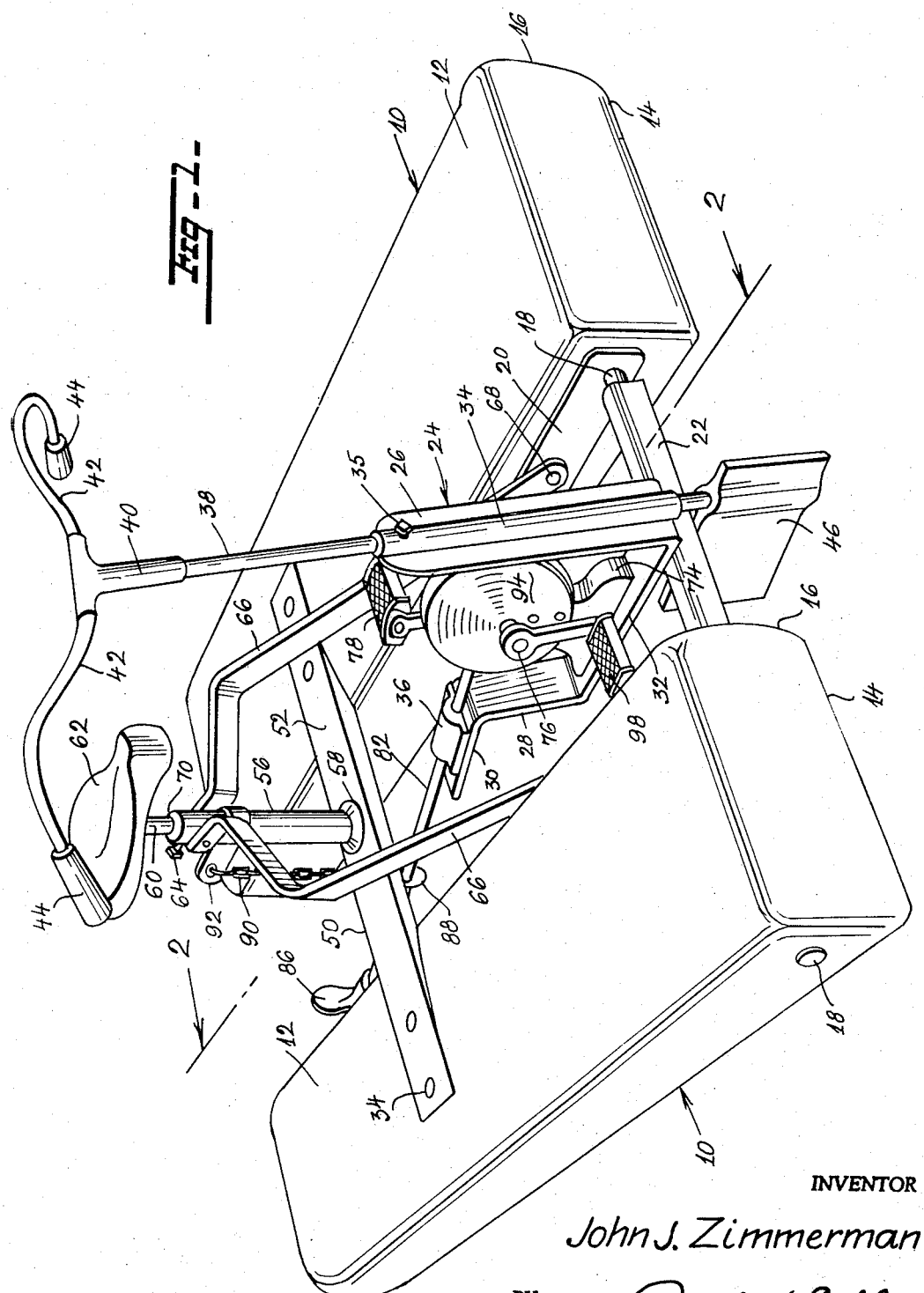
Fig-2-
INVENTOR
John J. Zimmerman
BY
Polachek & Saulsbury
ATTORNEYS Nov. 14, 1967  J. J. ZIMMERMAN  3,352,276
PONTOON BOAT CYCLE DRIVE
Filed April 3, 1967  2 Sheets-Sheet 2
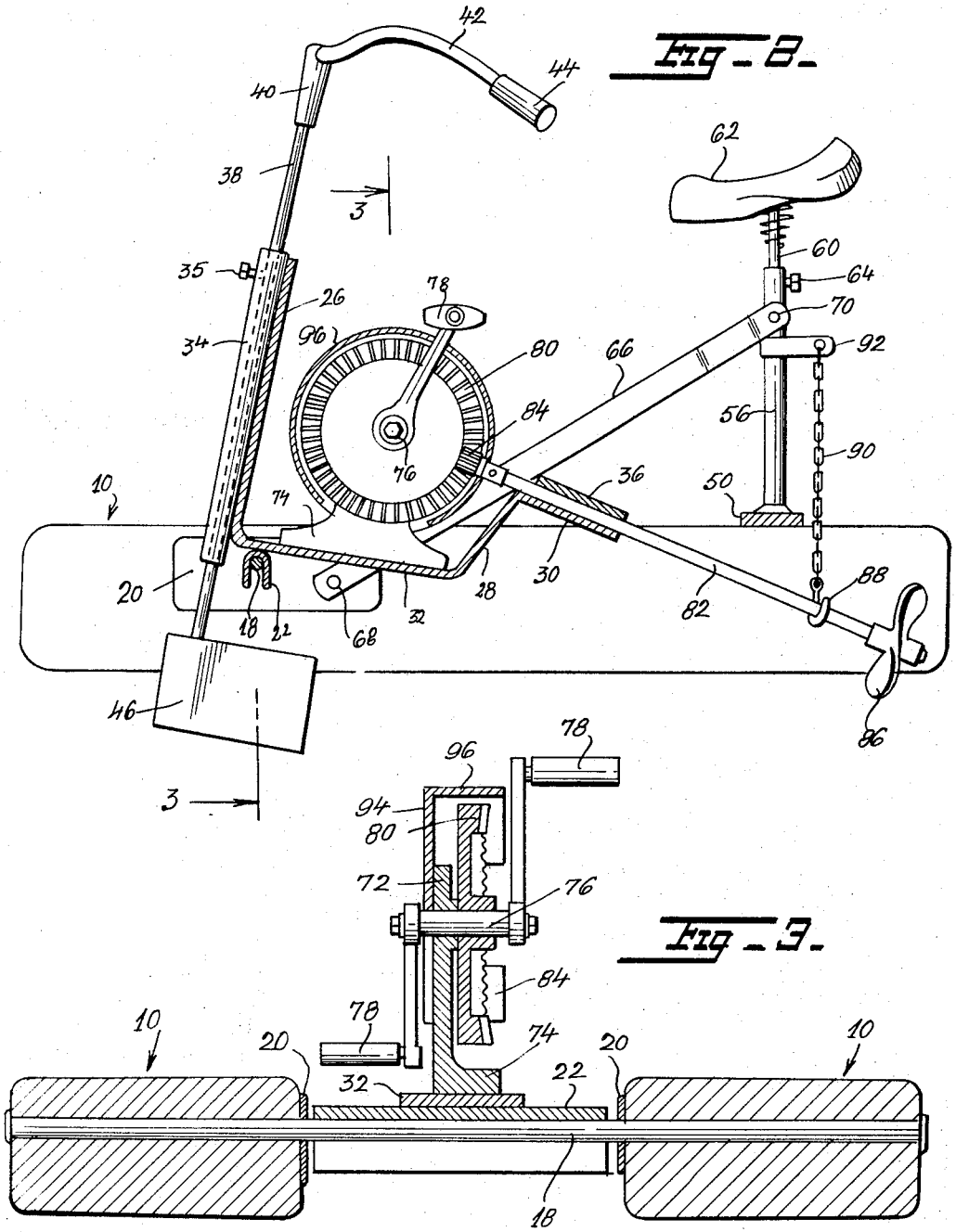
INVENTOR
John J. Zimmerman
BY
Placek & Saulsbury
ATTORNEYS

United States Patent Office 3,352,276
Patented Nov. 14, 1967

3,352,276
PONTOON BOAT CYCLE DRIVE
John J. Zimmerman, 101 N. Louisiana,
Morton, Ill. 61550
Filed Apr. 3, 1967, Ser. No. 627,897
10 Claims. (Cl. 115—26)

ABSTRACT OF THE DISCLOSURE

A water bicycle having a pair of spaced pontoons, a rod connecting the pontoons at one end, a flat bar connecting them at the other end, a sleeve on the rear flat bar, a seat on the sleeve, a U-shaped bracket connected to the connecting rod, a sleeve on one leg of the bracket, a rotatable steering shaft in the sleeve, and having handle bars, a rudder on the bottom end of the steering shaft, a propeller shaft rotatably supported on the other leg, a propeller on the end of the propeller shaft and means for operating the propeller including a rotatable shaft, a drive gear on the shaft, pedals on the rotatable shaft and a pinion on the end of the propeller shaft meshing with the drive gear whereby motion of the pedals is transmitted to the propeller.

---

This invention relates generally to water vehicles and more particularly to new and useful improvements in a water bicycle.

In recent years, bicycle propelled catamarans have again become very popular for lake and amusement re sorts but considerable difficulty has been experienced with the proper assembling of the propeller shafts relative to the pontoons and the drive mechanism.

It is accordingly one of the primary objects of the present invention to provide novel means for mounting the propeller shaft.

Another object of the invention is to provide a water bicycle with a pair of pontoons and a supporting means in the form of a bicycle construction and connected in turn with a screw propeller and rudder therefor whereby the said water bicycle may be both propelled and guided by the operator in a similar manner with the riding and simulating in every respect the movement through which a bicycle rider takes during the operation thereof.

Still another object of the invention is to provide a novel water bicycle which will be durable and efficient in operation, one that will be simple and easy to manufacture, and one which can be placed upon the market and afford a maximum amount of amusement for the user thereof.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a top perspective view of a water bicycle embodying my invention.

FIG. 2 is a vertical sectional view taken on the plane of the line 2—2 of FIG. 1.

FIG. 3 is a vertical sectional view taken on the plane of the line 3—3 of FIG. 1.

Referring now more particularly to the accompanying drawings, it will be seen that the water bicycle forming the subject of this invention includes a pair of spaced pontoons 10, 10 which may be constructed of styrofoam plastic, wood, aluminum or other suitable material. The pontoons are rectangular in shape with flat top surfaces 12 and bottom flat surfaces 14, and with slightly curved side surfaces 16, 16. The pontoons are disposed in the same horizontal plane and are connected and held in spaced relationship by an elongated round rod 18 extending through one end of the pontoons, the front end as viewed in FIG. 1, and through opposed metal plates 20 on the opposed inner surfaces thereof and suitably fixed thereon. An elongated bearing member 22 inverted U-shaped in cross-section, is seated on the rod 18 in the space between the pontoons.

In order to provide means for propelling the pontoons, I provide a channel-shaped frame 24 of flat metal with a long leg 26 and a short leg 28, the short leg terminating in a perpendicular extension 30. The bight portion 32 of the frame seats on and is welded to the bearing member 22. A tubular bearing member 34 is welded to the outer surface of the long leg 26, and its center, and a bearing 36 is welded to the top surface of the extension 30. A steering shaft or stem 38 extends through the tubular bearing member 34 projecting at both ends thereof, and is held in adjusted position by a set screw 35 extending through a hole in the tubular member 34. A T-fitting 40 is mounted on the top end of the steering shaft or post 38 for supporting handle bars 42, 42 provided with hand grips 44, 44. A rudder 46 is fixed on the bottom end of the steering shaft 38 in the space between the pontoons 10, 10.

An elongated metal plate 50 with flat top surface 52 bridges the space between the pontoon spaced from the other end or rear end thereof, the plate being fixed on the top surfaces of the pontoons by rivets 54 thereby bracing and connecting the pontoons. An upright sleeve 56 is fixed on the top surface of the plate 50 midway its ends by means of a ring 58. A round bar 60 carrying a saddle seat 62 on the top thereof slides in the sleeve 56 and is held in adjusted position by means of a set screw 64.

A pair of elongated flat angular brackets 66, 66 have one end fixed to the plates 20 by rivets 68 and the other end engaging the top of the sleeve 56 and fixed thereto by set screws 70.

An upright bearing plate 72 having a broad enlarged base 74 is welded to the bight portion 32 of the bracket 24 longitudinally thereof and journalled in the bearing plate 72 there is a pedal shaft 76 provided with pedals 78. A toothed drive gear 80 is fixed on the pedal shaft 76 between the pedals. A propeller shaft 82 is journalled in the bearing member 36 on the extension 30 of the bracket 24 and fixed on one end thereof is a pinion 84 in mesh with the teeth of the drive gear 80. The other end of the propeller shaft extends down between the pontoons 10 at the front ends thereof and carries fixedly a propeller 86 thereat. The propeller shaft 82 is adapted to be supported at its free end by means of a hook 88 on the end of a depending chain 90 depending from a bracket 92 secured around the sleeve 56 mounting the seat 62. A circular plate 94 is fixed on the pedal shaft 76 to one side of bearing plate 72 and is provided with a peripheral flange 96 extending inwardly over the teeth of the gear 80 providing a protection against the teeth.

In use of the improved water bicycle, the user thereof operates the pedals 78 similar to a bicycle and the propeller 86 will effectively drive the bicycle through the water. The rudder 46 is used in the ordinary manner to steer the bicycle and is also used together with the pontoons for balancing purposes similar to the front wheel of a bicycle and owing to the position of the rudder, the same readily serves for this purpose. The pontoons 10 move as a unit. As the bicycle gains speed, the same becomes more stable and there is less necessity for using the rudder 46 for balancing purposes.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. In a water bicycle of the character described, a pair of spaced pontoons, a rod connecting one end thereof, a flat bar connecting the pontoons adjacent the other end thereof, an upright sleeve supported on the rear flat bar, an adjustable seat mounted in said sleeve and extending thereabove, a U-shaped bracket supported on the connecting rod at said one end of the pontoons, a sleeve supported on one leg of the bracket, adjacent said connecting rod, a steering shaft rotatably mounted within the sleeve, handle bars for the steering shaft, a rudder fixed on the bottom end of the steering shaft between the pontoons, a bearing member on the other leg of the bracket, a propeller shaft rotatably supported at one end in said bearing member, extending to the other end of the pontoons, between the pontoons a propeller fixed on the end of said propeller shaft, and means supported on the bight portion of the U-shaped bracket for operating the propeller.

2. A structure as defined in claim 1, wherein means is provided for supporting the other end of the propeller shaft, including a bracket supported at the top of the sleeve on the rear flat bar, a chain depending from said bracket and a hook on the bottom end of the chain embracing said end of the propeller shaft.

3. A water bicycle as defined in claim 1, wherein the means for operating the propeller includes an upright support fixed on the bight portion of the U-shaped bracket, a shaft rotatably mounted horizontally on said upright support, an annular drive gear fixed on said shaft, pedals fixed on the ends of the latter shaft for rotating the same, and a pinion fixed on said one end of the propeller shaft in mesh with the teeth on the drive gear whereby motion of the pedals is transmitted to the propeller.

4. A water bicycle as defined in claim 3, wherein means is provided for covering the teeth of the drive gear to protect the user of the bicycle, said means including a circular plate fixed on the horizontal shaft laterally of the drive gear and a peripheral flange on the circular plate extending over the teeth of the drive gear for the major portion thereof.

5. A water bicycle as defined in claim 1, wherein means is provided for supporting the other end of the propeller shaft, including a bracket supported at the top of the sleeve on the rear flat bar, a chain depending from said bracket and a hook on the bottom end of the chain embracing said other end of the propeller shaft, and wherein the means for operating the propeller includes an upright support fixed on the bight portion of the U-shaped bracket, a shaft rotatably mounted horizontally on said upright support, an annular drive gear fixed on said shaft, pedals fixed on the ends of the latter shaft for rotating the same, and a pinion fixed on said one end of the propeller shaft in mesh with the teeth on the drive gear whereby motion of the pedals is transmitted to the propeller.

6. A water bicycle as defined in claim 1, wherein means is provided for supporting the other end of the propeller shaft, including a bracket supported at the top of the sleeve on the rear flat bar, a chain depending from said bracket and a hook on the bottom end of the chain embracing said other end of the propeller shaft, and wherein means is provided for covering the teeth of the drive gear to protect the user of the bicycle, said means including a circular plate fixed on the horizontal shaft laterally of the drive gear and a peripheral flange on the circular plate extending over the teeth of the drive gear for the major portion thereof.

7. A structure as defined in claim 1, wherein means is provided for supporting the other end of the propeller shaft, including a bracket supported at the top of the sleeve on the rear flat bar, a chain depending from said bracket and a hook on the bottom end of the chain embracing said other end of the propeller shaft, wherein the means for operating the propeller includes an upright support fixed on the bight portion of the U-shaped bracket, a shaft rotatably mounted horizontally on said upright support, an annular drive gear fixed on said shaft, pedals fixed on the ends of the latter shaft for rotating the same, and a pinion fixed on said one end of the propeller shaft in mesh with the teeth on the drive gear whereby motion of the pedals is transmitted to the propeller, and wherein means is provided for covering the teeth of the drive gear to protect the user of the bicycle, said latter means including a circular plate fixed on the horizontal shaft laterally of the drive gear and a peripheral flange on the circular plate extending over the teeth of the drive gear for the major portion thereof.

8. A water bicycle as defined in claim 1, wherein the steering shaft is adjustable up and down in the sleeve, said seat being spring pressed, and wherein means is provided for holding the steering shaft and seat in adjusted position.

9. A water bicycle as defined in claim 1, wherein the sleeve mounting the seat is braced by a pair of brackets secured at one end to the sleeve and at the other end to the pontoons.

10. A water bicycle as defined in claim 1, wherein the steering shaft is adjustable up and down in the sleeve, said seat being spring-pressed and wherein means is provided for holding the steering shaft and seat in adjusted position, and wherein the sleeve mounting the seat is braced by a pair of brackets secured at one end to the sleeve and at the other end to the pontoons.

References Cited

FOREIGN PATENTS 902,023 11/1944 France.

MILTON BUCHLER, *Primary Examiner.*

ANDREW H. FARRELL, *Examiner.*